(12) United States Patent
Druenert et al.

(10) Patent No.: US 8,374,740 B2
(45) Date of Patent: Feb. 12, 2013

(54) SELF-LEARNING SATELLITE NAVIGATION ASSISTED HYBRID VEHICLE CONTROLS SYSTEM

(75) Inventors: Volker Druenert, Russelsheim (DE); Bruce J. Clingerman, North Rose, NY (US); William H. Pettit, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 321 days.

(21) Appl. No.: 12/766,597

(22) Filed: Apr. 23, 2010

(65) Prior Publication Data

US 2011/0264317 A1 Oct. 27, 2011

(51) Int. Cl.
*B60W 10/24* (2006.01)
(52) U.S. Cl. .......... 701/22; 180/65.275; 180/65.29
(58) Field of Classification Search .......... 701/22; 180/65.265, 65.275, 65.29, 65.31; 903/903, 903/906
See application file for complete search history.

(56) References Cited

U.S. PATENT DOCUMENTS

| | | | | |
|---|---|---|---|---|
| 5,815,824 | A * | 9/1998 | Saga et al. | 701/22 |
| 5,892,346 | A * | 4/1999 | Moroto et al. | 318/587 |
| 6,242,873 | B1 * | 6/2001 | Drozdz et al. | 318/139 |
| 6,314,347 | B1 * | 11/2001 | Kuroda et al. | 701/22 |
| 7,543,670 | B2 * | 6/2009 | Tamai et al. | 180/197 |
| 7,849,944 | B2 * | 12/2010 | DeVault | 180/65.29 |
| 8,116,915 | B2 * | 2/2012 | Kempton | 700/291 |
| 2005/0228553 | A1 * | 10/2005 | Tryon | 701/22 |
| 2009/0306866 | A1 * | 12/2009 | Malikopoulos | 701/59 |

* cited by examiner

*Primary Examiner* — Joseph Rocca
*Assistant Examiner* — Timothy Wilhelm
(74) *Attorney, Agent, or Firm* — John A. Miller; Miller IP Group, PLC

(57) ABSTRACT

A self-learning assisted hybrid vehicle system that includes a main power source for providing power to the vehicle, a supplemental power source for providing supplemental power for providing power to the vehicle and an electric motor or other mechanical system for driving the vehicle. The system also includes a self-learning controls unit that receives and stores information from a plurality of inputs associated with the vehicle. The self-learning controls unit uses the information to make predictions about future driving conditions of the vehicle to efficiently utilize the power sources of the hybrid vehicle.

19 Claims, 4 Drawing Sheets

SELF-LEARNING SATELLITE NAVIGATION ASSISTED HYBRID VEHICLE CONTROLS SYSTEM

BACKGROUND OF THE INVENTION

1. Field of the Invention

This invention relates generally to a system and method for optimizing the operation of a hybrid vehicle and, more particularly, to a system and method for predicting near future routes and driving conditions using a self-learning control and vehicle location to efficiently utilize the power sources of the hybrid vehicle.

2. Discussion of the Related Art

Hybrid vehicles are vehicles that use two or more distinct power sources to power the vehicle. Hybrid electric vehicles are most common, and typically combine an internal combustion engine with a DC battery and one or more electric motors or other mechanical system for driving the vehicle. Another type of hybrid electric vehicle is a vehicle that combines a fuel cell system with a DC battery and an electric motor or other mechanical system for driving the vehicle. An ultracapacitor and/or a flywheel may be used instead of, or in addition to, a DC battery in both of the previously mentioned hybrid vehicles, as any medium for storing electrical energy may be utilized.

Hybrid vehicles can operate using four different basic operating modes. A first operating mode includes driving with the electric motor or motors powered by the battery alone. In a second operating mode, the hybrid vehicle may operate by using the internal combustion engine or fuel cell system alone. In a third operating mode, a combination of driving with the electric motor or motors powered by the battery and internal combustion engine or fuel cell system. In a fourth operating mode, the hybrid vehicle is slowed down by utilizing regenerative braking, which enables charging of the DC battery or ultracapacitor.

Reduction of greenhouse gases is an important goal to address a variety of health and environmental concerns. Therefore, vehicle fuel efficiency is becoming more important, particularly with the inevitable tightening of corporate average fuel economy (CAFÉ) requirements. Furthermore, fuel prices are likely to climb as limited oil reserves are being depleted, particularly in light of the ever expanding world vehicle market. Thus, it is becoming more important to increase vehicle fuel economy whenever it can be cost effective to do so.

Hydrogen is an attractive fuel because it is clean and can be used to efficiently produce electricity in a fuel cell. A hydrogen fuel cell is an electro-chemical device that includes an anode and a cathode with an electrolyte therebetween. Some portion of fuel cell vehicles are likely to include a series hybrid arrangement, thus the scheduling of fuel cell power versus battery state-of-charge (SOC) is relevant to the efficiency and performance of the vehicle.

From just the fuel cell point of view, a hybrid vehicle is more efficient at lighter loads. From the vehicle point of view, a hybrid vehicle is more efficient while maintaining a fairly low state-of-charge of the battery or ultracapacitor because it can accept more regenerative braking energy. Unfortunately, if the battery is kept at a state-of-charge that is too low, it may hurt performance at times of high power demand, such as passing maneuvers or when ascending steep inclines. A low state-of-charge of the battery in a hybrid vehicle employing a fuel cell system may put the fuel cell stack in a high load condition for an extended period of time, which negatively affects the efficiency of the fuel cell system, and also puts difficult thermal demands on the system, such as requiring a large radiator area that may not package effectively in a vehicle, or force a larger, more costly and less efficient cooling fan.

Generally, if power demands of the hybrid vehicle are low, and if the vehicle is doing a lot of starts and stops, a low state-of-charge of the battery or ultracapacitor is the most efficient way to operate the vehicle because a low state-of-charge of the battery or ultracapacitor allows for the most regenerative braking energy. City-type driving is the best example of this condition.

Periods of high power demand are generally short-lived, such as when passing or ascending a steep incline, therefore, the most efficient way to operate a hybrid vehicle during high power demands is with a high initial state-of-charge of the battery or ultracapacitor. Since the battery or ultracapacitor can provide most of the power needed when it has a high state-of-charge, the fuel cell system is able to operate at a much lower, more efficient, load point and still provide the hybrid vehicle with the needed power.

Thus, to optimize hybrid vehicle efficiency, the battery or ultracapacitor state-of-charge needs to be low in city-type driving conditions, and high for high load situations, such as for passing or ascending steep inclines. However, appreciably changing the state-of-charge of a battery or ultracapacitor may take several minutes. Thus, it is impossible to raise the state-of-charge in a few seconds or less when it is suddenly needed. Therefore, there is a need in the art to be able to determine and/or predict future power demands of a hybrid vehicle to enable the state-of-charge of the battery or ultracapacitor to be prepared for high power demand events.

SUMMARY OF THE INVENTION

In accordance with the teachings of the present invention, a self-learning assisted hybrid vehicle system for a vehicle is disclosed. The self-learning assisted hybrid vehicle system includes a main power source, such as an internal combustion engine or a fuel cell stack, and a supplemental power source, such as a battery. The system also includes an electric motor or other mechanical system that drives the vehicle. The supplemental power source provides electrical power to the electric motor to supplement the main power source. The system also includes a self-learning controls unit that receives and stores information from a plurality of inputs associated with the vehicle. The self-learning controls unit uses the information to make predictions about future driving conditions of the vehicle to efficiently utilize the power sources to power the vehicle.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for optimizing the operation of a hybrid vehicle is merely exemplary in nature, and is in no way intended to limit the invention or its applications or uses.

Figure 1:
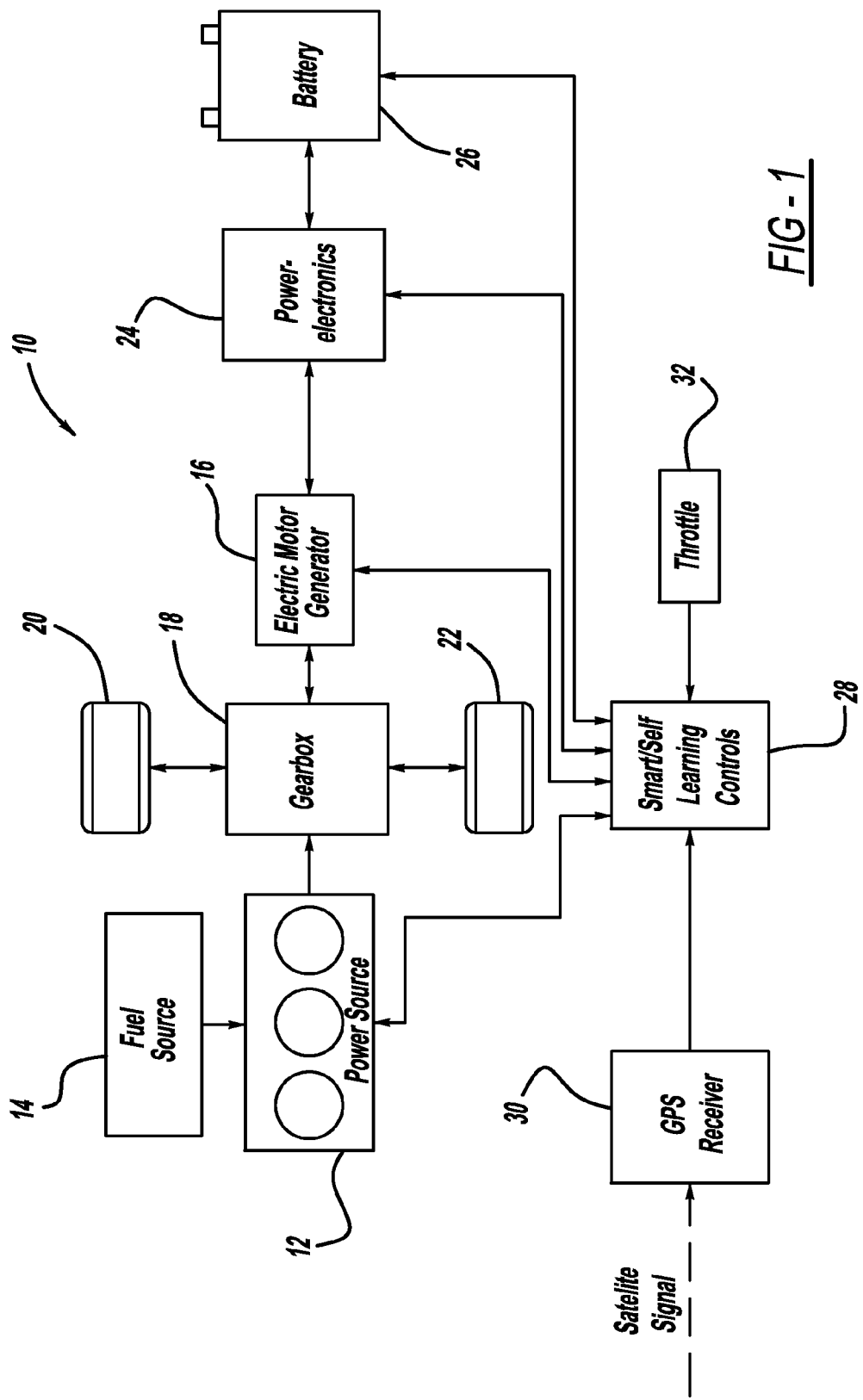
FIG. 1 is a schematic block diagram of a self-learning assisted hybrid vehicle.

FIG. 1 is a schematic block diagram of a self-learning assisted hybrid vehicle system 10 for a vehicle including an internal combustion engine or a fuel cell system, each referred to generally as main power source 12. The vehicle includes a fuel source 14, such as a gasoline tank or a hydrogen tank. The system 10 also includes an electric motor/generator or other mechanical system 16 that drives the vehicle. A gearbox 18 is driven by power from the power source 12 if the power source 12 is an internal combustion engine in a known manner, and the gear box 18 drives wheels 20 and 22 of the vehicle. Although not specifically shown, if the power source 12 is a fuel cell stack in a series hybrid configuration, it would provide power to the electric motor/generator 16, which drives the gearbox 18 and the wheels 20 and 22 of the vehicle in a known manner. A DC battery 26 operates as a supplemental power source to the main power source 12 and provides electrical power to the motor/generator 16. Alternately, the battery 26 can be an ultracapacitor. The system 10 also includes power electronics 24 that conditions the power from the battery 26 and the regenerative braking power from the wheels 20 and 22 that is used to charge the battery 26 in a manner that is well understood by those skilled in the art. The power electronics 24 also steps up the DC voltage from the battery 26 to match the battery voltage to the bus line voltage dictated by the voltage output of the fuel cell stack and step down the stack voltage during battery recharging.

The power source 12, the electric motor/generator 16, the power electronics 24 and the battery 26 are in communication with a self-learning controls unit 28 to allow the unit 28 to determine the most optimal mode of operation, as is described in more detail below. A GPS receiver 30 provides positional information to the self-learning controls unit 28. A throttle 32 provides a driver power request to the unit 28.

The vehicle may, depending on a number of parameters, operate under four different basic operating modes including: (i) drive with the electric motor/generator 16 powered by the battery 26 alone, (ii) drive using the power source 12 alone, (iii) drive using a combination of the electric motor/generator 16 and the power source 12, or (iv) using the power generated by regenerative braking from braking of the wheels 20 and 22. Typically, an electronic controls algorithm defines which of the above drive modes may be utilized. The main decisive parameters for determining which drive mode to utilize is the battery state-of-charge, the power required/being requested, and the speed at which the vehicle is traveling. Although not shown in FIGS. 1 and 2 for the sake of clarity, sensors are located on each of the components and inputs of the vehicle to transmit the signals required from the components to the self-learning controls unit 28 to enable the controls unit 28 to predict near future conditions so as to choose the most optimal operating mode for the vehicle, as is discussed in more detail below.

In predicting the near future and optimizing the operating mode of the vehicle, it is important for the self-learning controls unit 28 to choose an appropriate operating mode. The importance of these parameters can be demonstrated with the following examples:

1. Power can only be drawn from the battery 26 if the battery 26 is above a predetermined state-of-charge. The battery 26 must have a certain state-of-charge as a prerequisite for the operation of the electric motor/generator 16;
2. If the state-of-charge of the battery 26 is below a predetermined level, the battery 26 is charged by the power source 12, or is charged by regenerative braking from the wheels 20 and 22;
3. In the case of high power demand, for example high acceleration, the power source 12 as well as the battery 26 will deliver the power required to the gearbox 18 to propel the vehicle;
4. In the case of low power demand, for example slow speed and/or slow acceleration, the battery 26 can deliver the power required to the gearbox 18 to propel the vehicle; and
5. During braking of the wheels 20 and 22, kinetic energy can be recovered and stored in the battery 26 through the process of regenerative braking, as is known to those having skill in the art.

As stated above, the battery 26 must have a certain state-of-charge as a prerequisite for the operation of the electric motor/generator 16. One major drawback to a conventional hybrid system operating as described in (1)-(5) above is that it lacks knowledge about the power requirements of the near future. Without knowledge about the power requirements of the very near future, the charging and discharging of the battery 26 must follow a generic pattern which is not optimal in terms of, for example, energy efficiency, emissions and fuel efficiency. Therefore, the present invention utilizes the self-learning controls unit 28 to optimize the interaction between the power source 12 and the electric motor/generator 16 so as to optimize performance, emissions, fuel consumption and/or other desirable attributes of the self-learning satellite navigation assisted hybrid vehicle, such as voltage swing and other similar learned driving habits of a driver of the vehicle. Combining the learned driving habits with other predicted conditions allows the operation of the vehicle to be optimized, as discussed in more detail below.

As discussed above, the GPS receiver 30 detects the geographical position of the vehicle on the earth. Currently, the most widely spread system is the satellite based Global Positioning System (GPS), thus the acronym GPS is used herein. However, those having skill in the art will recognize that other methods or systems may be used to detect the actual geographical position of the vehicle.

The self-learning controls unit 28 records and stores information about the routes driven by the vehicle. The information recorded includes, but is not limited to, the geographical position of the vehicle, the speed of the vehicle as a function of geographical position, the state-of-charge of the battery 26 as a function of geographical position of the vehicle, the day of the week, and the time of day. The information recorded and stored by the self-learning controls unit 28 allows the controls unit 28 to "learn" the driving habits of a driver of the vehicle. The information that may be learned by the controls unit 28 includes, but is not limited to, on which day and at which time a driver usually drives to a particular location, what the length of the trip will be, and what the power demand will be as a function of geographical position and time of day. Additionally, in order to assist the controls unit 28 in the self-learning process, a driver recognition method or system may be utilized to allow the controls unit 28 to quickly distinguish between a number of different drivers.

Utilizing the recorded and stored information described above, in combination with a tailored controls strategy, such as when to use the electric motor/generator 16, when to recharge the battery 26 and to what extent and within which period of time to use only the power source 12, the controls unit 28 can optimize the power distribution of the vehicle. For example, the controls unit 28 can optimize the power distribution of the power source 12, the charging pattern of the battery 26, and the use of the electric motor/generator 16 to reduce fuel consumption, reduce emissions, improve performance, or another objective of the vehicle.

Figure 2:
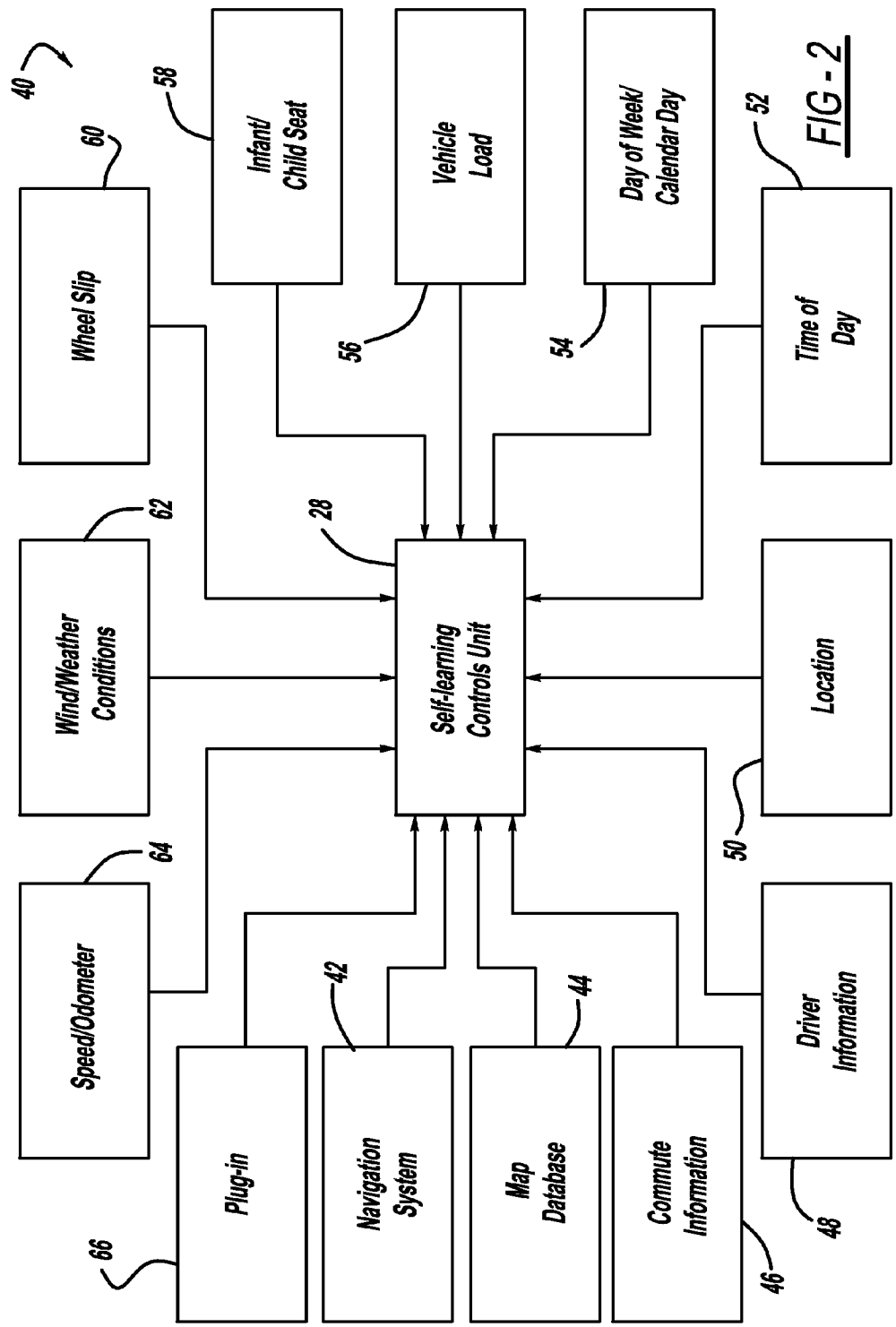
FIG. 2 is a flow diagram of the types of information recorded and stored by a self-learning controls unit.

FIG. 2 is a block diagram of a system 40 that shows inputs that may be used to provide the information recorded and stored by the self-learning controls unit 28 for predicting the power that will be required to enable the controls unit 28 to provide for optimal power distribution for the predicted trip. For example, the controls unit 28 may record and store information from a navigation system input 42, such as by using the GPS receiver 30, to determine the location of the vehicle. A map database input 44 may also be utilized by the controls system 28 to help predict the route of the vehicle. A commute information input 46, may be used to predict if the vehicle is taking a typical route, and may be combined with other information, such as a time of day input 52, a day of the week/calendar day input 54, and information from the GPS receiver 30, all of which are recorded and stored to build the database of the commute information input 46. Information regarding a driver identification input 48 may also be used by the controls unit 28 to help predict driver habits that translate to power demand variations, as is described in more detail below.

A location input 50 may also be utilized to determine the starting point of the vehicle at the beginning of a trip. Such information may help the controls unit 28 to predict the route of the vehicle, as described in more detail below. A vehicle load input 56, an infant/child safety seat input 58, a wheel slip input 60, a weather conditions input 62, a speed/odometer input 64, and a plug-in input 66 may also be utilized by the controls unit 28 to help determine the optimal power distribution of the hybrid vehicle, as is described in more detail below.

By taking into consideration all of the inputs described above, the self-learning controls unit 28 is capable of optimizing the power distribution of the hybrid vehicle for many purposes, such as optimizing vehicle efficiency. To optimize vehicle efficiency, the state-of-charge of the battery 26 typically needs to be low in city-type driving conditions and high for high power demand or high load situations. Since the state-of-charge of the battery 26 can take several minutes to change appreciably, it is impossible to raise the state-of-charge of the battery 26 in a few seconds or less when power demands suddenly increase. Therefore, the self-learning controls unit 28 predicts future load or power demands of the vehicle to enable the state-of-charge of the battery 26 to be prepared in time for high power or high load events.

It is important to note that what is and is not optimal for a vehicle 10 may depend on the type of hybrid vehicle being used. Therefore, when it is stated that a lower or higher state-of-charge of the battery 26 is preferred, it is meant to be merely exemplary in nature and in no way intended to limit the scope of the invention. For example, the controls unit 28 may optimize differently for the optimum state-of-charge of the battery 26 depending on the type of hybrid vehicle in which the controls unit 28 is installed.

Since much of the driving of the vehicle is over a repetitive path, the self-learning controls unit 28 can recognize the repetitive path in a number of ways. For example, the vehicle may utilize the GPS receiver 30, as discussed above. Alternatively, the controls unit 28 can monitor the speed/odometer input 64 to determine the route taken. The time of day input 52 and the day of the week/calendar day input 54 may also be used to recognize the route taken. The clock and/or calendar used may be an internal clock on the vehicle or from a satellite broadcast, such as OnStar™. If the vehicle has a navigation system and the route is entered, the route could be used. Once the route is recognized, the controls unit 28 can check past driving history for that particular route to determine typical points in the trip that require higher loads or higher power. Higher load or higher power points could be from hills, areas with passing lanes, higher speeds, or similar conditions that would increase the power demands of the vehicle. As the area of higher load or higher power demand gets closer, the power source 12 can be run at slightly higher load or higher power to build up the state-of-charge of the battery 26. OnStar™ could also receive public driving patterns, like diverted traffic for a closed road, and adjust the SOC in anticipation of the new route.

In an internal combustion engine type of hybrid vehicle, the increase in the state-of-charge of the battery 26 may be used to promote fuel efficiency and/or to avoid high power emissions. In contrast, in both internal combustion engine type hybrid vehicles and fuel cell type hybrid vehicles, if city-type driving conditions are predicted, the state-of-charge of the battery 26 can be lowered to take advantage of the regenerative braking energy available. If the controls unit 28 cannot predict the future driving conditions, the vehicle may simply be operated at a state-of-charge of the battery 26 that is a mid-point between high power demand operation and city-type driving conditions, i.e., a standard/generic operating mode.

Even if the controls unit 28 does not recognize the total planned route of the vehicle, the controls unit 28 can still predict the near future with some degree of accuracy. For example, by using the GPS receiver 30 or other satellite reporting, the present location of the vehicle can predict likely driving conditions. By way of example, higher load or higher power demands may be predicted if the vehicle is ascending Pike's Peak, or if the vehicle is on the Autobahn. Similarly, if the vehicle is in the heart of New York City the controls unit 28 can predict that city-type driving conditions will occur in the near future.

Some vehicles may be equipped with driver buttons to set seat and mirror positions for a particular driver. The driver identification input 48 may be utilized to set seat and mirror positions for a particular driver as well as to look up the driving habits of that particular driver that have been recorded and stored by the controls unit 28. In addition, if the vehicle 10 does not have a driver recognition button or if the driver is initially unknown to the controls unit 28, the controls unit 28 can monitor the speed and odometer inputs 64 to determine the driver's braking habits. Therefore, the controls unit 28 may then optimize the power distribution for that driver. For example, a driver that typically waits until the last second to brake may operate with a lower state-of-charge for the battery 26 to enable the battery to accept more regenerative braking energy. Alternatively, if a driver typically drives differently when an infant or child is a passenger in the vehicle 10, the infant/child seat sensor 58 could be used to predict, for example, that more coasting will occur and therefore less regenerative braking energy will be available.

If the vehicle has a database of past fuel consumption during a particular route with a particular driver, the controls unit 28 can also determine if the vehicle has abnormal loading using the vehicle load input 56. For example, the vehicle may be using more fuel because of extra passengers or because the vehicle is towing a trailer, or because the vehicle 10 has low tire pressure, or due to wind resistance against the vehicle. Other ways of determining if the vehicle 10 has abnormal loading may be used instead of fuel consumption, such as seat sensors that determine if a load is placed on the seats, a trailer hitch or trailer light plug-in sensor, and low tire pressure sensors.

The wheel slip input 60 and the wind/weather input 62 may be used to determine if the vehicle will require extra power for a given route due to wind resistance or inclement weather conditions. For example, on a cold snowy day, the vehicle may require more energy to operate the power electronics 24 of the vehicle, or the available power of the battery 26 or ultracapacitor is reduced. Despite the reason, if the vehicle predicts that a greater than usual amount of power will be required, it can adjust the power distribution to optimize the operation of the vehicle by taking all the detected or predicted conditions described above into consideration.

For example, on working days, such as Monday through Friday, the vehicle is regularly driven between 7:30 and 7:55 a.m. from the "home base" of the vehicle to a location that is 32 km away. Based on information recorded and stored by the self-learning controls unit 28, it is known that very few deviations from the given route occur. After arriving at the location that is 32 km away from the home base, the vehicle is parked for eight hours. Thereafter, the vehicle is returned to the home base. Deviations from the morning route exist, and those deviations are typically one of three different locations. The vehicle is parked overnight at the home base during the week, and on weekends the vehicle is typically driven to two of four different locations with a certainty of ninety-five percent. Those locations may include, for example, a tennis court and/or a shopping center. Each of the four different locations are recorded and stored by the self-learning controls unit 28 and are a known distance from the home base. For example, the tennis court is 12 km away and the shopping center is 21 km away.

Based on the day of the week input 54 and the time of day input 52, the self-learning controls unit 28 can make a "first guess" of the imminent route and destination of the vehicle. Thus, the controls unit 28 can allocate energy between the power source 12 and the electric motor/generator 16 to maximize efficiency and/or operate according to other requirements, such as minimizing emissions. After the first guess is made by the controls unit 28, the GPS receiver 30 determines whether the first guess by the controls unit 28 is accurate. If the first guess is accurate, the controls unit 28 uses recorded and stored information about the driver's driving patterns and routes to specify an optimal power distribution. Each driving event allows for more information to be recorded and stored by the controls unit 28, which may be recalled at the next driving event.

In the event the first guess by the controls unit 28 is not accurate, as determined by the GPS receiver 30 and other inputs to the controls unit 28, and a second guess cannot be made because the driving patterns and/or route are unknown to the controls unit 28, the vehicle 10 is operated in a standard/generic mode and the power is distributed between the power source 12 and the electric motor/generator 16 without the use of the GPS receiver 30 or the information recorded and stored by the controls unit 28.

By way of another example, geographical data, such as the course of the streets and highways as well as particularities, such as speed limit, grade, etc. of a given route, may be recorded and stored by the controls unit 28 to help the controls unit 28 distribute power. Such information may be provided by various inputs, such as the navigation system input 42, the map database input 44, the commute input 46 and the location input 50, which help refine the prediction of the power demand that will be required in the near future. Additionally, in another example, additional information, such as wind speed and weather conditions at the location of the vehicle 10, as determined by the wind/weather conditions input 62, and the predicted route may be utilized by the controls unit 28 when predicting the power demand that will be required in the near future.

By predicting the route of the near future as well as the driver particularities and driving conditions in terms of an expected power demand, the controls unit 28 can optimize the power distribution of the vehicle 10 to improve fuel efficiency, emissions, state-of-charge swings of the battery 26, voltage swings of the fuel cell system that is part of the power source 12 (if applicable), and the durability of the power source 12, the battery 26, and the electric motor/generator 16, as well as other optimizations of other components or subsystems of the vehicle.

If, for example, a commuter drives to work from Honeoye to Honeoye Falls, the vehicle must drive up a 500 feet incline in altitude. Using the self-learning controls unit 28 to predict that this is a typical commute for the driver, based on inputs such as the navigation system input 42, the time of day input 52, the commute information input 46, the day of the week/calendar day input 54 and the driver identification input 48, the controls unit 28 may bring the state-of-charge of the battery 26 down to a lower than average value because it is likely that the return trip home at the end of the day will allow the vehicle to utilize a significant amount of regenerative braking.

In another example, if it is determined that the vehicle is approaching the vehicle home base, a determination that may be made by utilizing inputs such as the navigation system input 42, the map database input 44 and/or the commute information input 46, and if the controls unit 28 determines that it is late in the evening by utilizing the time of day input 52, the controls unit 28 may optimize operation by allowing the state-of-charge of the battery 26 to drop to a lower than average value because it is expected that an overnight charge of the battery 26 will occur based on information recorded and stored using the plug-in input 66. In one embodiment, the driver of the vehicle may be alerted that the state-of-charge of the battery 26 is in a depletion mode, thereby giving the driver the option to override the depletion mode if desired.

After a commute database is built-up in the controls unit 28 using the commute input 46, the state-of-charge of the battery 26 may be determined during the trip so that it may be optimized. For example, if the controls unit 28 chooses a target state-of-charge for the battery 26 during parts of the commute, the efficiency of the power distribution of the vehicle 10 could be calculated based on the recorded information. An adaptive algorithm may then move the target state-of-charge for the battery 26 up and down on subsequent commutes and then compare the results to optimize efficiency.

In another example, if a typical passing zone is approaching, or if a steep incline that requires increased load is approaching, the controls unit 28 may predict this using information recorded and stored from previous commutes, such as information stored using the commute information input 46, and may build up the state-of-charge of the battery 26 instead of operating the power source 12 at higher power or higher loads that are less efficient.

In another example, if the controls unit 28 determines that aggressive city-type driving conditions are occurring or are predicted to occur, the controls unit 28 may allow larger state-of-charge swings of the battery 26 to occur to maximize the regenerative braking energy available. Aggressive city-type driving conditions may be detected by driver habits using the driver identification input 48, and also by utilizing the speed/odometer input 64.

In another example, if the controls unit 28 determines that a stop is likely, followed by a sharp acceleration, such as a blind intersection, which may be detected utilizing the map database input 44, the commute information input 46, the navigation system input 42, the controls unit 28 may allow the state-of-charge of the battery 26 to increase just prior to a stop. Alternatively, if the controls unit 28 determines that a stop is likely and also determines that the driver typically brakes hard at stop signs instead of coasting up to the stop sign, the controls unit 28 may allow the state-of-charge of the battery 26 to drop slightly in anticipation of utilizing regenerative braking energy.

In another example, if the vehicle is heavily loaded or towing a trailer, as may be determined utilizing the vehicle load input 56, the controls unit may allow the state-of-charge of the battery 26 to drop lower at certain points of the route, as greater potential for regenerative braking energy is expected. Heavier loading may be determined by quantifying the amount of power it takes for the vehicle to meet past acceleration or steady state performance by utilizing the speed/odometer input 64.

In another example, if a driver hits a button or otherwise indicates that a plug-in will occur, such as by utilizing the plug-in input 66, the controls unit 28 may lower the state-of-charge of the battery 26 to below normal levels in anticipation of the impending charge of the battery 26. Operating the vehicle in this manner will help improve fuel efficiency as well as reduce emissions.

In another example, if the vehicle is ascending a large hill, the controls unit 28 may allow the state-of-charge of the battery 26 to drop below normal levels if it is predicted that the vehicle will soon go back down the hill or will soon stop at a stop sign, thereby allowing for regenerative braking to occur.

Any onboard, day-to-day or drive-to-drive database requires the use of a non-volatile random access memory (RAM), which is limited and expensive in an automotive controller. However, it is much more cost effective to maintain the day-to-day or drive-to-drive database at a location remote from the vehicle, because hard-drive space is inexpensive in a bulk, non-automotive environment. Therefore, at vehicle key-on, an OnStar™, or similar system, may download the important parameters of the day-to-day or drive-to-drive database. Alternatively, the OnStar™ may stream the important parameters of the day-to-day or drive-to-drive database based on a request from the vehicle 10. For example, the self-learning controls unit 28 may utilize a $6^{th}$ order polynomial curve to determine the best target state-of-charge for the battery 26 for the commute to work, which may then be uploaded to a remote hard-drive through OnStar™.

Figure 3:
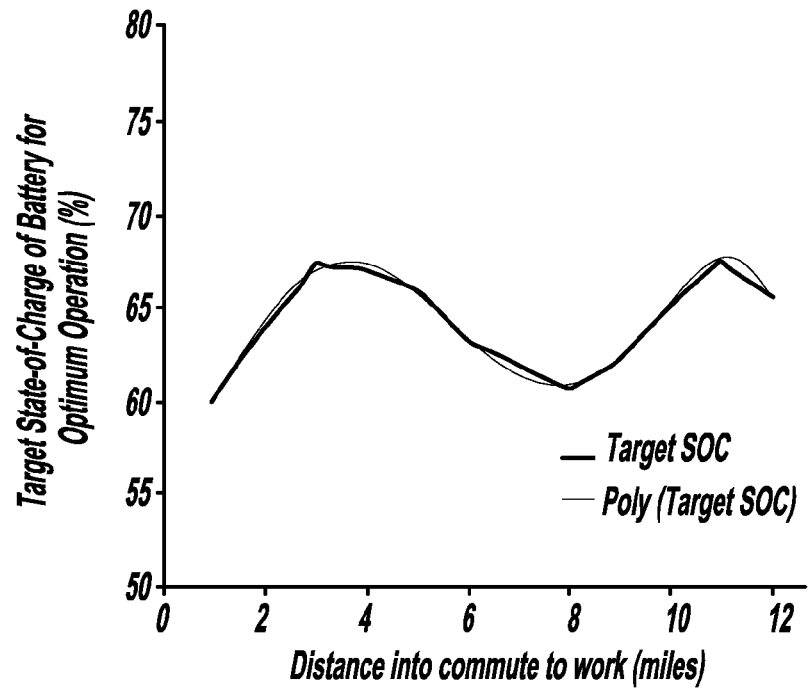
FIG. 3 is a graph with distance into a commute to work in miles on the x-axis and target state-of-charge (SOC) of a battery on the y-axis.

In another example, at vehicle key-on, or the moment the commute is recognized by the controls unit 28, the vehicle 10 may download the desired parameters, coefficients and other important database information, thereby not being required to maintain the database in the non-volatile RAM on the vehicle 10. FIG. 3 is a graph with distance into a commute to work in miles on the x-axis and target state-of-charge (SOC) of the battery 26 on the y-axis, and illustrates an example for a target SOC curve fit with the coefficients to upload or download. Using such an off-vehicle database enables comparative analyses to be performed to compare, for example, different SOC levels during the commute and to update the coefficients when the vehicle 10 is keyed-on again. Utilizing an off-vehicle database also avoids the burden of high real-time CPU throughput with the controls units 28, as the off-vehicle database may be slow and inexpensive since it typically will have 24 hours to analyze the data provided. Furthermore, an off-vehicle database may also allow for software and algorithm uploads to be done centrally, i.e., off the vehicle 10, which avoids the time and expense associated with bringing the vehicle in for new software or software upgrades.

Figure 4:
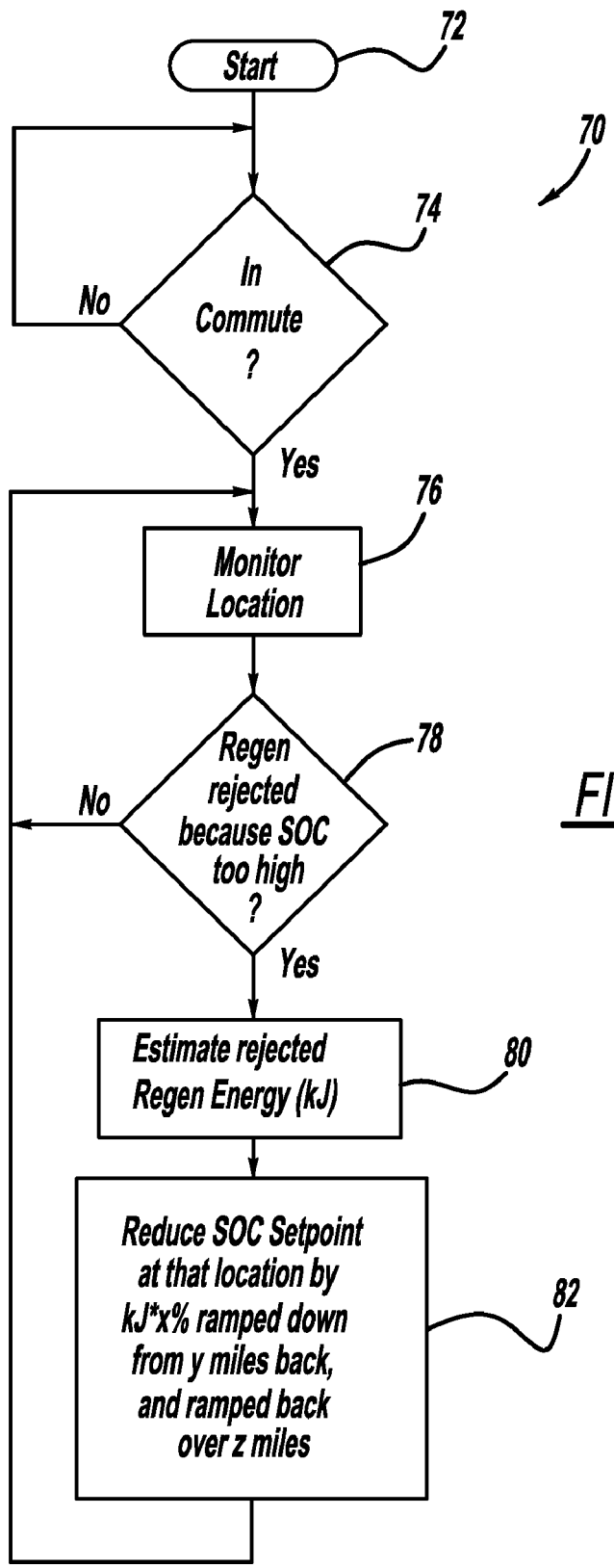
FIG. 4 is a flow chart diagram of an algorithm that corrects for inefficiencies in operation.

FIG. 4 is a flow chart diagram 70 of an exemplary algorithm of how the controls unit 28 may correct for inefficiencies in operation that occur the next time the inefficient condition occurs. The algorithm begins at start box 72 and determines if the vehicle 10 is in a recognized commute, such as a work commute, at decision diamond 74. If not, the algorithm continues to determine if the vehicle 10 is in a recognized commute at the decision diamond 74. If the vehicle 10 is in a recognized commute, the location of the vehicle 10 within the commute is monitored at box 76. Once the location of the vehicle 10 is successfully monitored, the algorithm determines if regenerative braking has to be rejected because the state-of-charge of the battery 26 is too high at decision diamond 78. If the algorithm determines that the SOC of the battery 26 is not too high, regenerative braking occurs and the algorithm continues to monitor the location of the vehicle 10 in the commute at the box 76.

If the algorithm determines that the state-of-charge of the battery 26 is too high, the algorithm rejects using regenerative braking during a braking event. This forces the vehicle 10 to slow down using a traditional braking system, such as disc brakes and calipers, causing the energy to dissipate as waste heat instead of recoverable energy to charge the battery 26. Such a situation in which regenerative braking energy is rejected and dissipated as waste heat using traditional disc brakes and calipers may happen every morning of a commute if the system does not adapt to that particular condition. Over years of commuting, the fuel wasted using a non-adaptive generic control system could eventually add up to a tremendous amount of wasted fuel.

The algorithm of FIG. 4 adapts to the situation discussed above by recognizing the commute and calculating the amount of energy that is estimated to dissipate as waste heat using a traditional braking system, and this estimation occurs at box 80. The algorithm for recognizing the commute is not shown in FIG. 4 for the sake of clarity. The calculation for estimating the amount of waste heat dissipated using a traditional braking system is also not shown, however, any calculation commonly used by those skilled in the art may be used.

Once the algorithm has calculated the estimated amount of regenerative braking at the box 80, an inefficient mode can be avoided during the next day's commute by bringing the state-of-charge of the battery 26 down in the few miles prior to the point in the commute where the regenerative braking was previously rejected, which occurs at box 82. Thus, the state-of-charge of the battery 26 at this point in the commute is lower the following day, conserving fuel since the vehicle 10 draws off the battery 26 instead, thereby allowing the battery 26 to accept more regenerative braking.

Figure 5:
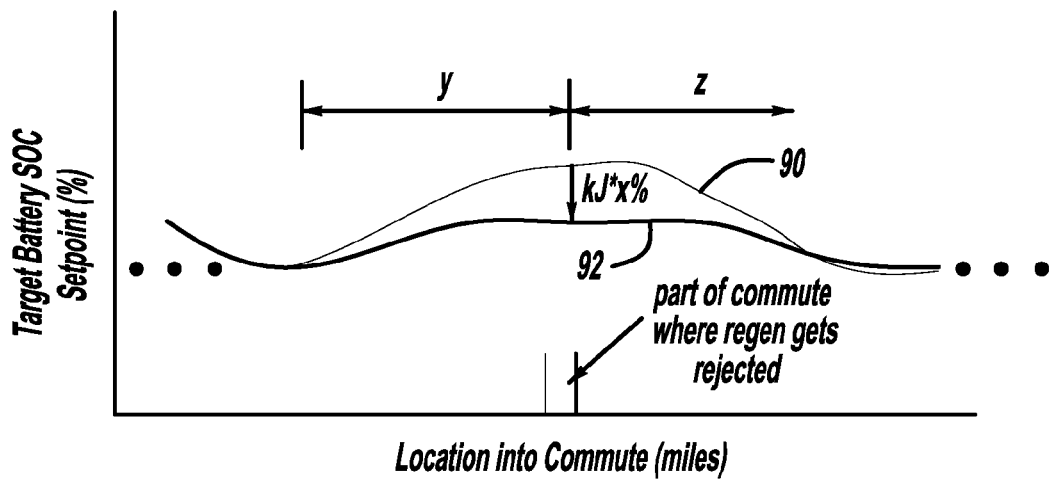
FIG. 5 is a graph with location into commute in miles on the x-axis and target battery state-of-charge (SOC) set-point percentage on the y-axis.

FIG. 5 is a graph with location into commute in miles on the x-axis and target battery state-of-charge (SOC) set-point percentage on the y-axis. Line 90 represents the original SOC set-point, and line 92 is the new SOC set-point after the algorithm of FIG. 4 has adjusted to allow for regenerative braking to occur instead of dissipating energy as waste heat. The amount of SOC of the battery 26 is lowered, i.e., the target SOC set-point, is calibrated to the specifics of the hybrid vehicle 10. The key parameters are the time before and the time after the regenerative event, shown as y and z in FIG. 5, and the amount the SOC of the battery 26 is lowered to adjust for the regenerative event. For example, the controls unit 28 may drop the target SOC by 0.05% for every kJ of energy rejected. If 200 kJ were rejected, the controls unit 28 may set a new target SOC 0.05 times 200, or 10% less SOC than the previous commute.

If y and z are one mile each, to achieve the new target SOC the controls unit 28 may start lowering the SOC of the battery 26, relative to the previous day, one mile before the regenerative event. The new target SOC is, for example, 10% less at the regenerative event so as to allow for regenerative braking to occur instead of dissipating the energy as waste heat through traditional braking. Approximately one mile after the regenerative braking event, the new target SOC of the battery 26 may be the same, relative to the previous day.

Similarly, an algorithm may exist in the controls unit 28 to raise the SOC of the battery 26 in a similar manner if the power source 12 is forced to operate inefficiently because of a low SOC during a high performance event. According to such an algorithm, the controls unit 28 may slowly raise the SOC of the battery 26 prior to the typical performance demand within the commute, thereby preventing the high power demand of the power source 12 from reoccurring in later commutes.

The calibrations of the algorithms discussed above may be tuned such that one unusual event, e.g., braking for a deer, would have a small impact on the commute cycle. Many repeated events would ultimately tune the system for maximum efficiency.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A self-learning assisted hybrid vehicle system for a vehicle, said system comprising:
    a GPS receiver for determining the location of the vehicle;
    a main power source for providing main power for the vehicle;
    a supplemental power source for providing supplemental power for the vehicle;
    an electric motor receiving power from the supplemental power source and/or the main power source and driving the vehicle; and
    a self-learning controls unit programmed to be responsive to information from the GPS receiver and information from a plurality of inputs associated with the vehicle, wherein the plurality of inputs include vehicle load information from one or more vehicle load monitoring devices including infant/child seat information from infant/child seat monitoring devices, said self-learning controls unit using the information to make predictions about future driving conditions of the vehicle to efficiently utilize the main and supplemental power sources, wherein the self-learning controls unit optimizes the power distribution between the main power source and the supplemental power source to reduce fuel consumption, reduce emissions and/or improve performance of the vehicle.

2. The system according to claim 1, wherein the plurality of inputs include speed and distance information from a speed/odometer input.

3. The system according to claim 1, wherein the plurality of inputs include information from a map database, commute data from a commute information database, and driver information from a driver identification system/database.

4. The system according to claim 1, wherein the plurality of inputs include time of day, day of week and calendar day information.

5. The system according to claim 1, wherein the plurality of inputs include wheel slip information from one or more wheel slip monitoring devices and wind/weather conditions information from one or more wind/weather conditions monitoring devices.

6. The system according to claim 1, wherein the plurality of inputs include plug-in information from one or more plug-in monitoring devices and/or a plug-in database to predict when the vehicle will be plugged into a wall charger or similar external charging device.

7. The system according to claim 1, wherein the self-learning controls unit predicts future driving conditions to enable the vehicle to maximize the usable energy available from regenerative braking.

8. The system according to claim 1, further comprising an external hard-drive that is capable of sending and receiving information from the self-learning controls unit using the GPS receiver so as to enable a large amount of data from the vehicle to be collected and analyzed while minimizing the amount of nonvolatile random access memory required on the vehicle.

9. The system according to claim 1, wherein the supplemental power source is a DC battery, a flywheel or an ultracapacitor.

10. The system according to claim 1, wherein the main power source is a fuel cell system or an internal combustion engine.

11. A self-learning assisted hybrid vehicle system for a vehicle, said system comprising:
    a GPS receiver for determining the location of the vehicle;
    a main power source for providing main power for the vehicle, said main power source being an internal combustion engine or a fuel cell system;
    a battery for providing supplemental power for the vehicle;
    an electric motor or other mechanical system receiving power from the battery and driving the vehicle;
    power electronics for conditioning power from the battery and regenerative braking energy that charges the battery; and
    a self-learning controls unit that is programmed to receive information from a plurality of inputs associated with the vehicle, wherein the plurality of inputs include vehicle load information from one or more vehicle load monitoring devices including infant/child seat information from infant/child seat monitoring devices, said self-learning controls unit using the information to make predictions about future driving conditions of the vehicle to efficiently utilize the main and supplemental power sources so as to reduce fuel consumption, reduce emissions and/or improve performance of the vehicle.

12. The system according to claim 11, further comprising an external hard-drive that is capable of sending and receiving information from the self-learning controls unit using the GPS receiver so as to enable a large amount of data from the vehicle to be collected and analyzed while minimizing the amount of nonvolatile random access memory required on the vehicle.

13. The system according to claim 11, wherein the self-learning controls unit predicts future driving conditions to enable the vehicle to maximize the usable energy from regenerative braking.

14. The system according to claim 11, wherein the plurality of inputs include plug-in information from one or more plug-in monitoring devices and/or a plug-in database to predict when the vehicle will be plugged into a wall charger or similar external charging device.

15. The system according to claim 11, wherein the plurality of inputs include speed and distance information from a speed/odometer input.

16. The system according to claim 11, wherein the plurality of inputs include information from a map database, commute data from a commute information database, and driver information from a driver identification system/database.

17. The system according to claim 11, the plurality of inputs include time of day, day of week and calendar day information.

18. The system according to claim 11, wherein the plurality of inputs include wheel slip information from one or more wheel slip monitoring devices, and wind/weather conditions information from one or more wind/weather conditions monitoring devices.

19. A method for a self-learning assisted operating method for a hybrid vehicle, said method comprising:
provide a GPS receiver for determining the location of the vehicle;
providing a main power source for powering the vehicle;
providing a supplemental power source for providing supplemental power for the vehicle;
providing an electric motor or other mechanical system for driving the vehicle;
powering the electric motor and the main power source; and
providing a self-learning controls unit that is programmed to receive information from the GPS receiver and information from a plurality of inputs associated with the vehicle, wherein the plurality of inputs include vehicle load information from one or more vehicle load monitoring devices including infant/child seat information from infant/child seat monitoring devices, said self-learning controls unit using the information to make predictions about future driving conditions of the vehicle to efficiently utilize the power sources of the hybrid vehicle so as to reduce the fuel consumption, reduce emissions and/or improve performance of the hybrid vehicle.

* * * * *